United States Patent
Shah et al.

(10) Patent No.: US 10,567,703 B2
(45) Date of Patent: Feb. 18, 2020

(54) HIGH FRAME RATE VIDEO COMPATIBLE WITH EXISTING RECEIVERS AND AMENABLE TO VIDEO DECODER IMPLEMENTATION

(71) Applicant: Cisco Technology, Inc., San Jose, CA (US)

(72) Inventors: Bijal Shah, Berkshire (GB); Arturo A. Rodriguez, Norcross, GA (US); Kevin Alistair Murray, Hampshire (GB)

(73) Assignee: Cisco Technology, Inc., San Jose, CA (US)

( * ) Notice: Subject to any disclaimer, the term of this patent is extended or adjusted under 35 U.S.C. 154(b) by 46 days.

(21) Appl. No.: 15/613,340

(22) Filed: Jun. 5, 2017

(65) Prior Publication Data
US 2018/0352190 A1     Dec. 6, 2018

(51) Int. Cl.
*H04N 7/01*       (2006.01)
*H04N 19/172*     (2014.01)
*H04N 19/44*      (2014.01)
*H04N 21/4402*    (2011.01)

(52) U.S. Cl.
CPC .......... *H04N 7/013* (2013.01); *H04N 19/172* (2014.11); *H04N 19/44* (2014.11); *H04N 21/440281* (2013.01)

(58) Field of Classification Search
CPC .......... H04N 7/013; H04N 21/440281; H04N 5/23232; H04N 19/44; H04N 19/172
See application file for complete search history.

(56) References Cited

U.S. PATENT DOCUMENTS

| | | |
|---|---|---|
| 5,055,927 A | 10/1991 | Keesen et al. |
| 5,444,491 A | 8/1995 | Lim |
| 5,508,746 A | 4/1996 | Lim |
| 5,742,343 A | 4/1998 | Haskell et al. |

(Continued)

FOREIGN PATENT DOCUMENTS

| | | |
|---|---|---|
| EP | 0608092 A2 | 1/1994 |
| EP | 0910214 A1 | 4/1999 |

(Continued)

OTHER PUBLICATIONS

Iain E. G. Richardson H.264 and MPEG-4 Video Compression: Video Coding for Next-generation Multimedia (Year: 2003).*

(Continued)

*Primary Examiner* — Richard A Hansell, Jr.
(74) *Attorney, Agent, or Firm* — Merchant & Gould P.C.

(57) ABSTRACT

Methods and systems for achieving a high frame rate video with compatibility for existing receivers without depending bitstream encoding are provided herein. For example, an apparatus comprises: a memory; and one or more processors configured to execute instructions stored in the memory. The instructions comprise: receiving a first bitstream having a first packet identifier ("PID") and a second bitstream having a second PID; decoding the first bitstream and the second bitstream; and interleaving the decoded first bitstream and the decoded second bitstream to form a high frame rate video signal, wherein the high frame rate video signal has a frame rate equal to the sum of the frame rate of the decoded first bitstream and the decoded second bitstream.

19 Claims, 5 Drawing Sheets

(56) References Cited

U.S. PATENT DOCUMENTS

| | | |
|---|---|---|
| 5,923,820 A | 7/1999 | Cunnagin et al. |
| 5,966,120 A | 10/1999 | Arazi et al. |
| 6,208,382 B1 | 3/2001 | Glenn |
| 6,212,680 B1 | 4/2001 | Tsinberg et al. |
| 6,292,512 B1 | 9/2001 | Radha et al. |
| 6,337,716 B1 | 1/2002 | Yim |
| 6,353,613 B1 | 3/2002 | Kubota et al. |
| 6,369,861 B1 | 4/2002 | Lownes |
| 6,377,309 B1 | 4/2002 | Ito et al. |
| 6,542,518 B1 | 4/2003 | Miyazawa |
| 6,658,056 B1 | 12/2003 | Duruoz et al. |
| 6,757,911 B1 | 6/2004 | Shimoji et al. |
| 6,801,575 B1 | 10/2004 | Crinon |
| 7,020,205 B1 | 3/2006 | Beyers et al. |
| 7,023,992 B1 | 4/2006 | Kubota et al. |
| 7,346,055 B2 | 3/2008 | Chen et al. |
| 7,366,462 B2 | 4/2008 | Murali et al. |
| 7,405,765 B2 | 7/2008 | Chao |
| 7,672,377 B2 | 3/2010 | Heng et al. |
| 7,693,220 B2 | 4/2010 | Wang et al. |
| 7,747,921 B2 | 6/2010 | DaCosta |
| 8,457,214 B2 | 6/2013 | Baird et al. |
| 8,848,780 B2 | 9/2014 | Rodriguez et al. |
| 8,934,553 B2 | 1/2015 | Baird et al. |
| 9,264,766 B2 | 2/2016 | Rodriguez et al. |
| 9,407,876 B1* | 8/2016 | Ernst ............ H04N 7/18 |
| 9,729,906 B2 | 8/2017 | Rodriguez et al. |
| 2001/0006404 A1 | 7/2001 | Yun |
| 2002/0037046 A1 | 3/2002 | Schaar et al. |
| 2002/0054638 A1 | 5/2002 | Hanamura et al. |
| 2002/0064189 A1 | 5/2002 | Coupe et al. |
| 2002/0075954 A1 | 6/2002 | Vince |
| 2002/0087999 A1 | 7/2002 | Kashima |
| 2002/0116715 A1* | 8/2002 | Apostolopoulos ...... H04L 29/06 725/86 |
| 2002/0162114 A1 | 10/2002 | Bisher, Jr. et al. |
| 2003/0058948 A1 | 3/2003 | Kelly et al. |
| 2003/0138043 A1 | 7/2003 | Hannuksela |
| 2004/0093337 A1 | 5/2004 | Shen et al. |
| 2004/0240860 A1 | 12/2004 | Bruls et al. |
| 2004/0244059 A1 | 12/2004 | Coman |
| 2004/0264931 A1 | 12/2004 | Nakashika et al. |
| 2005/0015794 A1 | 1/2005 | Roelens |
| 2005/0036067 A1 | 2/2005 | Ryal et al. |
| 2005/0135285 A1 | 6/2005 | Vlot |
| 2005/0210523 A1 | 9/2005 | Parnell et al. |
| 2006/0023748 A1 | 2/2006 | Chandhok et al. |
| 2006/0083308 A1 | 4/2006 | Schwarz et al. |
| 2006/0104348 A1* | 5/2006 | Chen ............ H04H 40/18 375/240.01 |
| 2006/0146734 A1 | 7/2006 | Wenger et al. |
| 2006/0271990 A1 | 11/2006 | Rodriguez et al. |
| 2007/0130498 A1* | 6/2007 | Hannuksela ........ G11B 27/005 715/234 |
| 2007/0206673 A1 | 9/2007 | Cipolli et al. |
| 2008/0037656 A1 | 2/2008 | Hannuksela |
| 2008/0205529 A1* | 8/2008 | Hannuksela ........... H04N 19/37 375/240.26 |
| 2009/0067507 A1 | 3/2009 | Baird et al. |
| 2009/0103605 A1 | 4/2009 | Rodriguez et al. |
| 2009/0103634 A1 | 4/2009 | Rodriguez et al. |
| 2009/0106812 A1 | 4/2009 | Rodriguez et al. |
| 2009/0106814 A1 | 4/2009 | Rodriguez et al. |
| 2009/0122183 A1 | 5/2009 | Rodriguez et al. |
| 2009/0122184 A1 | 5/2009 | Rodriguez et al. |
| 2009/0122185 A1 | 5/2009 | Rodriguez et al. |
| 2009/0122186 A1 | 5/2009 | Rodriguez et al. |
| 2009/0122190 A1 | 5/2009 | Rodriguez et al. |
| 2009/0122858 A1 | 5/2009 | Rodriguez et al. |
| 2009/0141794 A1 | 6/2009 | Rodriguez et al. |
| 2009/0144796 A1 | 6/2009 | Rodriguez et al. |
| 2009/0154553 A1 | 6/2009 | Rodriguez et al. |
| 2010/0040152 A1 | 2/2010 | Kortum et al. |
| 2010/0142615 A1 | 6/2010 | Han |
| 2010/0272174 A1* | 10/2010 | Toma ............ H04N 19/426 375/240.12 |
| 2010/0329328 A1* | 12/2010 | Kontola ........ H04N 21/234327 375/240.02 |
| 2011/0110436 A1* | 5/2011 | Schierl ........ H04N 21/234327 375/240.26 |
| 2011/0262106 A1 | 10/2011 | Yahata |
| 2012/0236115 A1* | 9/2012 | Zhang ............ H04N 19/597 348/43 |
| 2013/0272431 A1 | 10/2013 | Baird et al. |
| 2014/0118541 A1* | 5/2014 | Lasko ............ G08B 13/19682 348/143 |
| 2014/0321555 A1* | 10/2014 | Rossato ............ H04N 19/46 375/240.26 |
| 2015/0063790 A1* | 3/2015 | Rodriguez ............ G11B 27/005 386/351 |
| 2015/0281709 A1* | 10/2015 | Bracha ............ H04N 19/36 375/240.26 |
| 2016/0021397 A1* | 1/2016 | Stepin ............ H04N 19/48 375/240.12 |

FOREIGN PATENT DOCUMENTS

| | | |
|---|---|---|
| EP | 1182877 A2 | 2/2002 |
| EP | 1667448 A1 | 6/2006 |
| WO | 1991007847 A1 | 5/1991 |
| WO | 2001076245 A2 | 10/2001 |
| WO | 2003026300 A | 3/2003 |
| WO | 2004057873 A1 | 7/2004 |
| WO | 2005055605 A1 | 6/2005 |
| WO | 2006125052 A1 | 11/2006 |
| WO | 2007076486 A | 7/2007 |

OTHER PUBLICATIONS

Iain E. G. Richardson H.264and MPEG-4 Video Compression: Video Coding for Next-generation Multimedia (Year: 2003) (Year: 2003).*

Indian First Examination Report dated Jan. 23, 2018 cited in Application No. 2153/DELNP/2010, 11 pgs.

Yo-Sung Ho et al., "Video Coding Techniques for Ubiquitous Multimedia Services", Ubiquitous Convergence Technology; [Lecture Notes in Computer Science;; LNCS], Springer Berlin Heidelberg, val. 4412, Dec. 5, 2006, pp. 1-10, XP019078969, ISBN: 978-3-540-71788-1.

U.S. Final Office Action dated Aug. 17, 2012 cited in U.S. Appl. No. 12/343,059, 15 pgs.

U.S. Final Office Action dated Aug. 29, 2012 cited in U.S. Appl. No. 12/343,032, 22 pgs.

U.S. Final Office Action dated Sep. 13, 2012 cited in U.S. Appl. No. 12/342,824, 13 pgs.

U.S. Final Office Action dated Oct. 12, 2012 cited in U.S. Appl. No. 11/900,189, 14 pgs.

U.S. Final Office Action dated Nov. 8, 2012 cited in U.S. Appl. No. 12/342,569, 13 pgs.

U.S. Office Action dated Dec. 5, 2012 cited in U.S. Appl. No. 12/342,572 , 11 pgs.

U.S. Final Office Action dated Dec. 18, 2012 cited in U.S. Appl. No. 12/342,875, 12 pgs.

U.S. Final Office Action dated Dec. 18, 2012 cited in U.S. Appl. No. 12/342,914, 12 pgs.

U.S. Office Action dated Jan. 2, 2013 cited in U.S. Appl. No. 12/342,934, 11 pgs.

U.S. Office Action dated Jan. 31, 2013 cited in U.S. Appl. No. 12/342,567, 13 pgs.

U.S. Office Action dated Mar. 28, 2013 cited in U.S. Appl. No. 12/343,059, 16 pgs.

U.S. Office Action dated Mar. 29, 2013 cited in U.S. Appl. No. 12/342,569, 19 pgs.

U.S. Office Action dated Apr. 24, 2013 cited in U.S. Appl. No. 12/342,582, 10 pgs.

U.S. Office Action dated Apr. 30, 2013 cited in U.S. Appl. No. 12/342,946, 13 pgs.

(56) References Cited

OTHER PUBLICATIONS

U.S. Office Action dated May 8, 2013 cited in U.S. Appl. No. 12/342,576, 10 pgs.
U.S. Office Action dated May 21, 2013 cited in U.S. Appl. No. 12/343,032, 15 pgs.
U.S. Final Office Action dated May 30, 2013 cited in U.S. Appl. No. 12/342,572, 15 pgs.
U.S. Final Office Action dated Jun. 5, 2013 cited in U.S. Appl. No. 12/342,934, 12 pgs.
U.S. Final Office Action dated Jul. 18, 2013 cited in U.S. Appl. No. 12/342,567, 17 pgs.
U.S. Office Action dated Jul. 18, 2013 cited in U.S. Appl. No. 12/342,938, 11 pgs.
U.S. Office Action dated Jul. 22, 2013 cited in U.S. Appl. No. 12/342,824, 16 pgs.
U.S. Final Office Action dated Oct. 7, 2013 cited in U.S. Appl. No. 12/342,569, 15 pgs.
U.S. Final Office Action dated Oct. 10, 2013 cited in U.S. Appl. No. 12/343,032, 18 pgs.
U.S. Final Office Action dated Oct. 15, 2013 cited in U.S. Appl. No. 12/342,582, 12 pgs.
U.S. Final Office Action dated Oct. 31, 2013 cited in U.S. Appl. No. 12/343,059, 14 pgs.
U.S. Final Office Action dated Nov. 7, 2013 cited in U.S. Appl. No. 12/342,576, 13 pgs.
U.S. Final Office Action dated Nov. 27, 2013 cited in U.S. Appl. No. 12/342,946, 16 pgs.
U.S. Office Action dated Dec. 19, 2013 cited in U.S. Appl. No. 12/342,875, 11 pgs.
U.S. Final Office Action dated Jan. 13, 2014 cited in U.S. Appl. No. 12/342,824, 18 pgs.
U.S. Office Action dated Mar. 28, 2014 cited in U.S. Appl. No. 13/909,633, 10 pgs.
U.S. Office Action dated Mar. 27, 2015 cited in U.S. Appl. No. 12/342,569, 20 pgs.
Bayrakeri S et al., "MPEG-2/ECVQ Lookahead Hybrid Quantization and Spatially Scalable Coding," The Spie, Bellingham WA., vol. 3024, pp. 129-137.
Schwarz et al., "Overview of the Scalable Video Coding Extension of the H.264/AVC Standard," IEEE Transactions on Circuits and Systems for Video Technology, IEEE Service Center, Piscataway,NJ, US, vol. 17, 9, Sep. 2007, pp. 1103-1120, XP011193019.
Wiegand et al., "Overview of the H.264/AVC Video Coding Standard," IEEE Transactions on Circuits and Systems for Video Technology, vol. 13, 7, Jul. 2003, pp. 560-576, XP002509016.
Bergeron et al., "Soft-input decoding of variable-length codes applied to the H.264 standard," 2004 IEEE 6th Workshop of Multimedia Signal Processing, 2004, pp. 87-90.
ISO/IEC 1-13818 IS, Nov. 13, 1994, 156 pgs.
Gary Demos, "Temporal and Resolution Layering in Advanced Television," 35. MPEG Meeting; Aug. 7, 1996-Dec. 7, 1996; Tempere; (Motion Picture Expert Group or ISO/IEC JTC1/SC291WG11),, No. M1149, Jul. 9, 1996, XP030030543, ISSN: 0000-0329, pp. 1-23.
PCT Search Report dated Oct. 24, 2006 cited in Application No. PCT/US2006/019181, 5 pgs.
European Communication dated Jan. 21, 2011 cited in Application No. 08 830 482.9, 6 pgs.
Canadian Office Action dated Oct. 26, 2011 cited in Application No. 2,609,072, 2 pgs.
Chinese First Office Action dated Dec. 7, 2011 cited in Application No. 200880106264.8, 8 pgs.
European Communication dated Jan. 30, 2012 cited in Application No. 06760064.3, 6 pgs.
Chinese Second Office Action dated Aug. 3, 2012 cited in Application No. 200880106264.8, 21 pgs.
Chinese Rejection Decision dated Apr. 15, 2013 cited in Application No. 200880106264.8, 21 pgs.
European Summons to Attend Oral Proceedings dated Jun. 29, 2016 cited in Application No. 06760064.3, 8 pgs.
U.S. Office Action dated Jun. 2, 2008 cited in U.S. Appl. No. 11/132,060, 30pgs.
U.S. Office Action dated Mar. 20, 2009 cited in U.S. Appl. No. 11/132,060, 18 pgs.
U.S. Final Office Action dated Oct. 27, 2009 cited in U.S. Appl. No. 11/132,060, 20 pgs.
U.S. Office Action dated May 10, 2010 cited in U.S. Appl. No. 111/132,060, 17 pgs.
U.S. Office Action dated Nov. 8, 2010 cited in U.S. Appl. No. 11/132,060, 14 pgs.
U.S. Office Action dated Oct. 14, 2010 cited in U.S. Appl. No. 12/342,567, 21 pgs.
U.S. Office Action dated Oct. 1, 2010 cited in U.S. Appl. No. 12/342,572, 16 pgs.
U.S. Office Action dated Oct. 6, 2010 cited in U.S. Appl. No. 12/342,576, 18 pgs.
U.S. Office Action dated Sep. 28, 2010 cited in U.S. Appl. No. 12/342,582, 19 pgs.
U.S. Office Action dated Oct. 15, 2010 cited in U.S. Appl. No. 12/342,824, 19 pgs.
U.S. Final Office Action dated Apr. 9, 2010 cited in U.S. Appl. No. 12/342,914, 16 pgs.
U.S. Office Action dated Sep. 30, 2009 cited in U.S. Appl. No. 12/342,914, 14 pgs.
U.S. Office Action dated Sep. 16, 2010 cited in U.S. Appl. No. 12/342,914, 14 pgs.
U.S. Office Action dated Sep. 28, 2010 cited in U.S. Appl. No. 12/342,934, 12 pgs.
U.S. Final Office Action dated Apr. 13, 2010 cited in U.S. Appl. No. 12/342,934, 14 pgs.
U.S. Office Action dated Sep. 30, 2009 cited in U.S. Appl. No. 12/342,934, 16 pgs.
U.S. Office Action dated Oct. 8, 2010 cited in U.S. Appl. No. 12/342,938, 12 pgs.
U.S. Final Office Action dated May 11, 2010 cited in U.S. Appl. No. 12/342,938, 13 pgs.
U.S. Office Action dated Nov. 13, 2009 cited in U.S. Appl. No. 12/342,938, 13 pgs.
U.S. Final Office Action dated Mar. 21, 2011 cited in U.S. Appl. No. 12/342,576, 15 pgs.
U.S. Final Office Action dated Mar. 24, 2011 cited in U.S. Appl. No. 12/342,938, 16 pgs.
U.S. Office Action dated Apr. 1, 2011 cited in U.S. Appl. No. 12/342,572, 15 pgs.
U.S. Final Office Action dated Apr. 1, 2011 cited in U.S. Appl. No. 12/342,824, 14 pgs.
U.S. Final Office Action dated Apr. 6, 2011 cited in U.S. Appl. No. 12/342,567, 19 pgs.
U.S. Final Office Action dated Apr. 13, 2011 cited in U.S. Appl. No. 12/342,582, 16 pgs.
U.S. Office Action dated May 3, 2011 cited in U.S. Appl. No. 12/342,914, 14 pgs.
U.S. Office Action dated May 12, 2011 cited in U.S. Appl. No. 12/342,934. 14 pgs.
U.S. Final Office Action dated Jun. 22, 2011 cited in U.S. Appl. No. 11/132,060, 18 pgs.
U.S. Office Action dated Aug. 4, 2011 cited in U.S. Appl. No. 12/342,576, 13 pgs.
U.S. Office Action dated Aug. 26, 2011 cited in U.S. Appl. No. 12/342,582, 14 pgs.
U.S. Office Action dated Sep. 15, 2011 cited in U.S. Appl. No. 12/342,567, 16 pgs.
U.S. Final Office Action dated Sep. 20, 2011 cited in U.S. Appl. No. 12/342,572, 14 pgs.
U.S. Final Office Action dated Sep. 23, 2011 cited in U.S. Appl. No. 12/342,914, 14 pgs.
U.S. Final Office Action dated Sep. 23, 2011 cited in U.S. Appl. No. 12/342,934, 12 pgs.
U.S. Office Action dated Sep. 23, 2011 cited in U.S. Appl. No. 12/342,938, 14 pgs.
U.S. Office Action dated Dec. 6, 2011 cited in U.S. Appl. No. 11/900,189, 20 pgs.

(56) References Cited

OTHER PUBLICATIONS

U.S. Office Action dated Jan. 18, 2012 cited in U.S. Appl. No. 12/343,059, 24 pgs.
U.S. Office Action dated Mar. 1, 2012 cited in U.S. Appl. No. 12/343,032, 31 pgs.
U.S. Final Office Action dated Mar. 8, 2012 cited in U.S. Appl. No. 12/342,576, 12 pgs.
U.S. Office Action dated Mar. 16, 2012 cited in U.S. Appl. No. 12/342,824, 13 pgs.
U.S. Office Action dated Apr. 2, 2012 cited in U.S. Appl. No. 12/342,946, 23 pgs.
U.S. Final Office Action dated Apr. 11, 2012 cited in U.S. Appl. No. 12/342,582, 13 pgs.
U.S. Final Office Action dated May 8, 2012 cited in U.S. Appl. No. 12/342,567, 17 pgs.
U.S. Office Action dated May 9, 2012 cited in U.S. Appl. No. 12/342,569, 24 pgs.
U.S. Final Office Action dated May 8, 2012 cited in U.S. Appl. No. 12/342,938, 14 pgs.
U.S. Final Office Action dated May 23, 2012 cited in U.S. Appl. No. 12/342,572, 12 pgs.
U.S. Office Action dated May 23, 2012 cited in U.S. Appl. No. 12/342,914, 12 pgs.
U.S. Office Action dated Jun. 26, 2012 cited in U.S. Appl. No. 12/342,875, 21 pgs.
U.S. Office Action dated Jun. 27, 2012 cited in U.S. Appl. No. 11/900,189, 14 pgs.
U.S. Final Office Action dated Aug. 6, 2012 cited in U.S. Appl. No. 12/342,946, 14 pgs.

\* cited by examiner

HIGH FRAME RATE VIDEO COMPATIBLE WITH EXISTING RECEIVERS AND AMENABLE TO VIDEO DECODER IMPLEMENTATION

TECHNICAL FIELD

This disclosure relates in general to processing of video signals, and more particularly, to providing and receiving high frame rate ("HFR") video that is compatible with existing receivers while lessening the implementation complexity of the video decoder of existing receivers and of high-frame-rate-capable video decoders.

BACKGROUND

Typical schemes of providing High Frame Rate (HFR) video do not feature backward compatibility with existing receivers without imparting an impractical level of complexity to the video decoder of the existing receiver or to the video decoder implementation of high-frame-rate-video-capable receivers. One existing typical scheme, requires dependencies between a primary and secondary bitstream delivered as two separate transport bitstream PIDs, the primary bitstream corresponding to a Base Layer (BL) being backwardly compatible to a first generation type of video receiver, and the secondary bitstream corresponding to an Enhancement Layer (EL) that depends on the Base Layer. The EL corresponds to extra information that collectively with the information of the BL results in the higher frame rate video signal. Both of these streams may be delivered to a video decoder that must make sense of the dependencies between the layers.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DESCRIPTION OF EXAMPLE EMBODIMENTS

Overview

Figure 1:
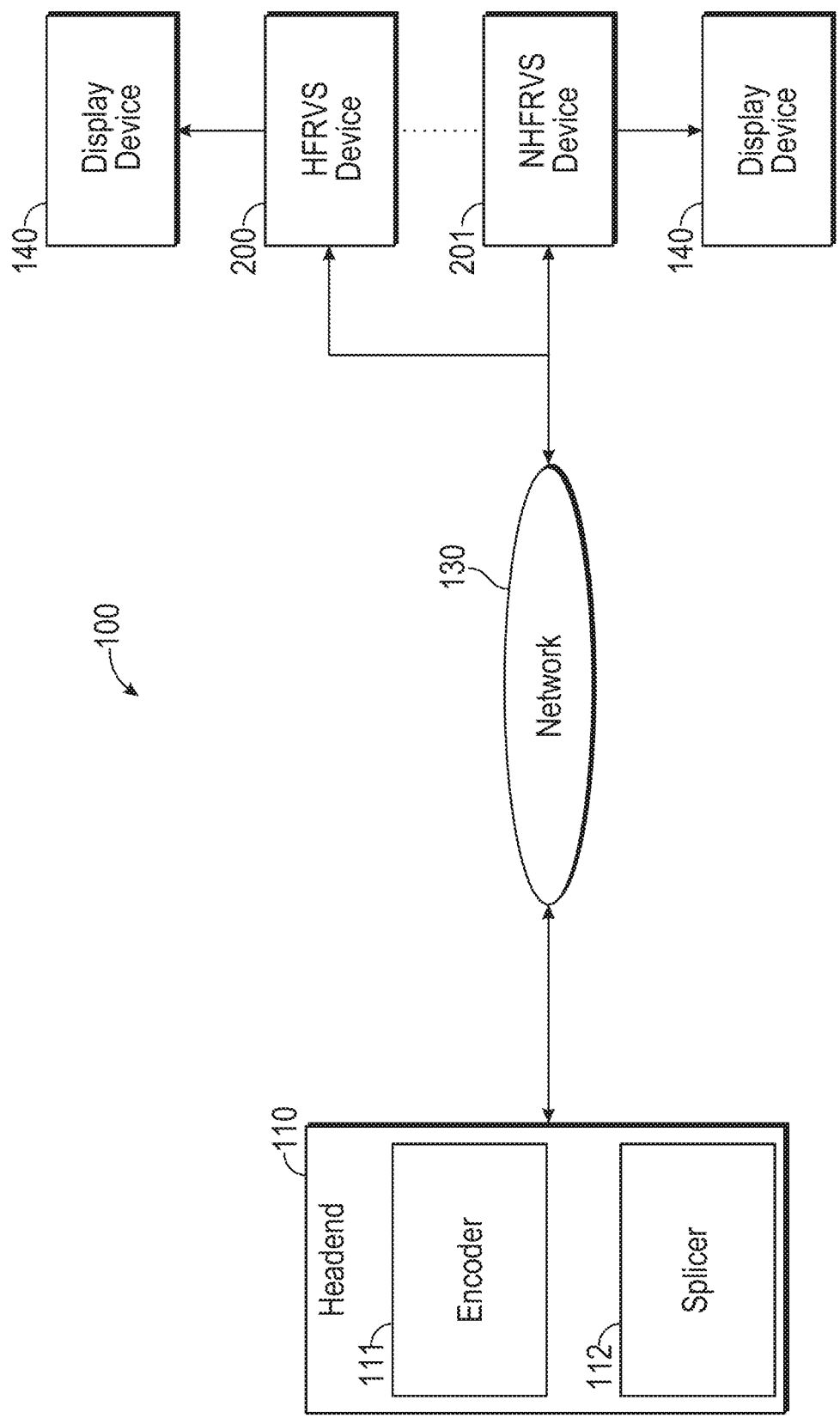
FIG. 1 is a block diagram that illustrates an example environment in which High Frame Rate Compatibility (HFRC) systems and methods may be implemented.

Methods and systems for providing and receiving HFR video with compatibility with existing receivers and ease of video decoder implementation are disclosed. For example, an apparatus comprises: a memory; and one or more processors configured to execute instructions stored in the memory. The instructions comprise: receiving a first bitstream having a first packet identifier ("PID") and a second bitstream having a second PID; decoding the first bitstream and the second bitstream; and interleaving the decoded first bitstream and the decoded second bitstream to form a high frame rate video signal, wherein the high frame rate video signal has a frame rate equal to the sum of the frame rate of the decoded first bitstream and the decoded second bitstream.

Alternative embodiments include a method, comprising: receiving a first bitstream having a first PID and a second bitstream having a second PID; decoding frames of the first bitstream and the frames of the second bitstream; and ordering the output of the decoded frames of the first bitstream and the decoded frames of the second bitstream to form a picture sequence corresponding to a HFRVS, wherein the HFRVS has a frame rate equal to the sum of the frame rate of the decoded video signal corresponding to the first bitstream and the frame rate of the decoded video signal corresponding to the second bitstream.

Other embodiments include an apparatus comprising: a memory; and one or more processors configured to execute instructions stored in the memory. The instructions comprise: receiving a high frame rate video signal; encoding the odd frames of the high frame rate video signal into a first video bitstream having a first PID; and encoding the even frames of the high frame rate video signal into a second video bitstream having a second PID, wherein the encoding of the odd frames and the even frames are independently encoded from each other.

Example Embodiments

The complexity imposed on a single video decoder by previously known schemes of providing High Frame Rate (HFR) video is high due to the desire for tight synchronization in real-time and bit-buffer compliance. Besides, these scalable video schemes are often promoted as featuring error robustness, but an impairment of Base Layer data impacts both Base and Enhancement Layers because of the secondary bitstream dependency.

It is desirable to provide a high-frame-rate video signal to a receiver housing a video decoder capable of processing a high-frame-rate video signal and to a receiver housing a video decoder capable of processing a lower-frame-rate video signal corresponding to a portion of the high-frame rate video signal, such that the high-frame-rate video signal does not impose impractical implementation complexity on either of the two respective types of video decoders.

Embodiments of the present disclosure achieve HFR video with compatibility for existing receivers without dependent bitstream encoding. This may be achieved by providing a UHDTV HFR video signal corresponding to a video program as two UHDTV video bitstreams, such that a first generation type of UHDTV receiver can process (decode and output) a first of the two UHDTV video bitstreams, and a second generation type of UHDTV receiver can process (decode and output) both of the two UHDTV video bitstreams and collectively provide the desired fidelity of a UHDTV HFR video signal.

Furthermore, the first UHDTV bitstream and second UHDTV bitstream are independently coded (and hence decoded independently) to provide error robustness. For example, the odd frames may be coded into the first UHDTV bitstream, and the even frames coded into the second UHDTV bitstream. The first UHDTV bitstream is encoded completely independently of the pictures in the second UHDTV bitstream. Likewise, the second UHDTV bitstream is encoded completely independently of the pictures in the first UHDTV bitstream. Therefore, each of the two UHDTV bitstream are independently decodable from the other. Also, as each bitstream is independent, no imposition is made on the encoder's selection of Group of Pictures ("GOP") structure or its use of the coded or decoded picture buffers.

To decode the combination of streams to achieve high frame rate on a second generation UHDTV receiver, two decoders (or two decoder instances) may be employed to respectively process each of the two UHDTV bitstreams: the first UHDTV bitstream and the second UHDTV bitstream. The output frames of each of the two respective decoders combine by managing their output through a common output pipeline, resulting in a coherent and contiguous picture sequence in output order. The signal is combined in this output pipeline. For example, if the first UHDTV bitstreams corresponds to odd numbered pictures and the second UHDTV bitstreams corresponds to even number pictures, upon decoding of the pictures of each respective UHDTV bitstream by a corresponding UHDTV video decoder (or UHDTV video decoder instance), the UHDTV pictures will reside in decoded and reconstructed form in the Decoded Picture Buffer ("DPB") of each respective video decoder. The output of the decoded pictures from the two respective DPBs is managed by interleaving the decoded pictures according to their corresponding presentation timestamps ("PTS"). This display interleaving can be achieved at the display control logic section of the video display pipeline in the receiver.

Both video decoders in the second generation type of UHDTV receiver operate on the same derived system clock derived from the UHDTV HFR video program, and in accordance with MPEG-2 Transport (as specified in ISO/IEC 13818-1), such video program having two video bitstreams with different bitstream types and therefore different packet identifiers ("PID's").

A first generation video decoder decodes the first UHDTV bitstream. Likewise, a receiver limited to one decoder, or capable of processing UHDTV video up to 50 or 60 fps, will process (decode and output) the first UHDTV bitstream, while not processing the second UHDTV bitstream. The second UHDTV bitstream has a different PID, and PID filtering blocks the second UHDTV bitstream from penetrating the receiver's memory beyond the PID filtering stage.

The use of two decoders on the receiver greatly simplifies the decoder logic because there are no dependencies between the streams. The implementation of the display interleave is simple in comparison to the complexity of frame dependency management in a single decoder receiving two PID's of video. Complexity is also mitigated by having to coalesce packets from two respective bitstreams into a single bit buffer. Additionally, there is no barrier to delivering the two PID's via different distribution paths, since each can be synchronized to the time base (i.e., common system clock) of the receiver independently.

The receiver does not have to wait to start rendering (outputting pictures) if it receives one of the two UHDTV bitstreams or if there is an error in the reception of the second UHDTV bitstream. This picture output management mechanism gracefully falls back to outputting pictures from a single bitstream display if the decoded picture for the next PTS increment (i.e., the decoded picture corresponding to the next picture output interval), which is trivial. If a frame is not available for the required presentation time, the immediately prior picture displayed (output) is repeated. Note that repeating the prior decoded picture is equivalent to outputting a UHDTV video signal, which is what a first generation type of UHDTV receiver provides for the same video program.

A main benefit of the paradigm disclosed herein is its simplicity (eradication of the onerous complexity in the prior paradigm of supporting scalable video coding ("SVC") in broadcast video applications) since the two decoders can operate independently. The video decoders have a common system clock permitting management of output of decoded pictures that stem from the two respective video decoders to be simple. Since fixed frame rate is employed (i.e., fixed frame rate is a requirement for broadcast applications), the PTS increment is known as a priori. If a decoded picture is not present (ready) for output, the prior output picture is repeated. This mechanism features error robustness. Furthermore, for most trick modes, one of the two bitstreams may be used to provide the pictures for the trick mode.

FIG. 1 is a block diagram that illustrates an example environment in which High Frame Rate Compatibility (HFRC) systems and methods may be implemented. In particular, FIG. 1 is a block diagram that depicts an example subscriber television system (STS) 100. In this example, the STS 100 includes a headend 110 and one or more video signal receive-and-process (VSRP) devices comprising high frame rate video signal device ("HFRVS") 200 and non-high frame rate video signal device ("NHFRVS") 201. NHFRVS 201 may be equipped with functionality to process UHDTV HFR video, while NHFRVS 201 may be able to process UHDTV standard video.

According to embodiments of the present disclosure, receivers, such as VSRP devices 200 and 201 and the headend 110 are coupled via a network 130. The headend 110 and the VSRP devices 200 and 201 cooperate to provide a user with television services, including, for example, broadcast television programming, interactive program guide (IPG) services, VOD services, PVR services, DVR services, and pay-per-view, as well as other digital services such as music, Internet access, commerce (e.g., home-shopping), voice-over-IP (VOIP), and/or other telephone or data services.

The VSRP device is typically situated at a user's residence or place of business and may be a stand-alone unit or integrated into another device such as, for example, the display device 140, a personal computer, personal digital assistant (PDA), mobile phone, among other devices. In other words, the VSRP device (also referred to herein as a digital receiver or processing device or digital home communications terminal (DHCT)) may comprise one of many devices or a combination of devices, such as a set-top box, television with communication capabilities, cellular phone, personal digital assistant (PDA), or other computer or computer-based device or system, such as a laptop, personal computer, DVD/CD recorder, among others. As set forth above, the VSRP device may be coupled to the display device 140 (e.g., computer monitor, television set, etc.), or in some embodiments, may comprise an integrated display (with or without an integrated audio component).

The VSRP device receives signals (video, audio and/or other data) including, for example, digital video signals in a compressed representation of a digitized video signal, referred also as a coded video signal, from the headend 110 through the network 130, and provides reverse information to the headend 110 through the network 130.

Television services may be presented via respective display devices 140, each of which typically may include a television set. However, the display devices 140 may also be any other device capable of displaying the sequence of pictures of a video signal or derived from a coded video signal including, for example, a computer monitor, a mobile phone, game device, etc. In one implementation, the display device 140 is configured with an audio component (e.g., speakers), whereas in some implementations, audio functionality may be provided by a device that is separate yet communicatively coupled to the display device 140 and/or VSRP device. Although shown communicating with a display device 140, the VSRP device may communicate with other devices that receive, store, and/or process coded video signals from the VSRP device, or that provide or transmit coded video signals or uncompressed video signals to the VSRP device.

The network 130 may comprise a single network, or a combination of networks (e.g., local and/or wide area networks). Further, the communications medium of the network 130 may comprise a wired connection or wireless connection (e.g., satellite, terrestrial, wireless LAN, etc.), or a combination of both. In the case of wired implementations, the network 130 may comprise a hybrid-fiber coaxial (HFC) medium, coaxial, optical, twisted pair, etc. Other networks are contemplated to be within the scope of the disclosure, including networks that use packets incorporated with and/or are compliant to MPEG-2 Transport with HEVC coding or other transport layers or coding protocols.

The headend 110 may include one or more server devices (not shown) for providing coded video signals, audio, and other types of media or data to client devices such as, for example, the VSRP device. The headend 110 may receive content from sources external to the headend 110 or STS 100 via a wired and/or wireless connection (e.g., satellite or terrestrial network), such as from content providers, and in some embodiments, may receive package-selected national or regional content with local programming (e.g., including local advertising) for delivery to subscribers. The headend 110 may also include one or more encoders (encoding devices or compression engines) 111 (one shown) and one or more video processing devices embodied as one or more splicers 112 (one shown) coupled to the encoder 111. In some embodiments, the encoder 111 and splicer 112 may be co-located in the same device and/or in the same locale (e.g., both in the headend 110 or elsewhere), while in some embodiments, the encoder 111 and splicer 112 may be distributed among different locations within the STS 100. For instance, though shown residing at the headend 110, the encoder 111 and/or splicer 112 may reside in some embodiments at other locations such as a hub or node. The encoder 111 and splicer 112 are coupled with suitable signaling or provisioned to respond to signaling for portions of a coded video signal corresponding to a video service or video program where commercials are to be inserted.

Furthermore, encoder 111 may encode a UHDTV HFR picture sequence into two UHDTV bitstreams, with each bitstream having half the frame rate of the UHDTV HFR video: a first UHDTV bitstream comprising odd numbered pictures and a second UHDTV bitstream comprising even numbered pictures, for example. Each of the two bitstreams is encoded by encoder 111 independently of the other bitstream.

The STS 100 may comprise an IPTV network, a cable television network, a satellite television network, a cellular network, a subscriber network, or a combination of two or more of these networks or other networks. Further, network PVR and switched digital video are also considered within the scope of the disclosure. Although described in the context of video processing, it should be understood that certain embodiments of the HFRC systems described herein also include functionality for the processing of other media content such as coded audio signals or compressed audio streams.

The STS 100 comprises additional components and/or facilities not shown. For instance, the STS 100 may comprise one or more additional servers (Internet Service Provider (ISP) facility servers, private servers, on-demand servers, channel change servers, multi-media messaging servers, program guide servers), modulators (e.g., QAM, QPSK, etc.), routers, bridges, gateways, multiplexers, transmitters, and/or switches (e.g., at the network edge, among other locations) that process and deliver and/or forward (e.g., route) various digital services to subscribers.

In one embodiment, the HFRC system includes the headend 110 and one or more of the VSRP devices. In some embodiments, the HFRC system includes portions of each of these components, or in some embodiments, one of these components or a subset thereof. In some embodiments, one or more additional components described above yet not shown in FIG. 1 may be incorporated in an HFRC system.

Figure 2:
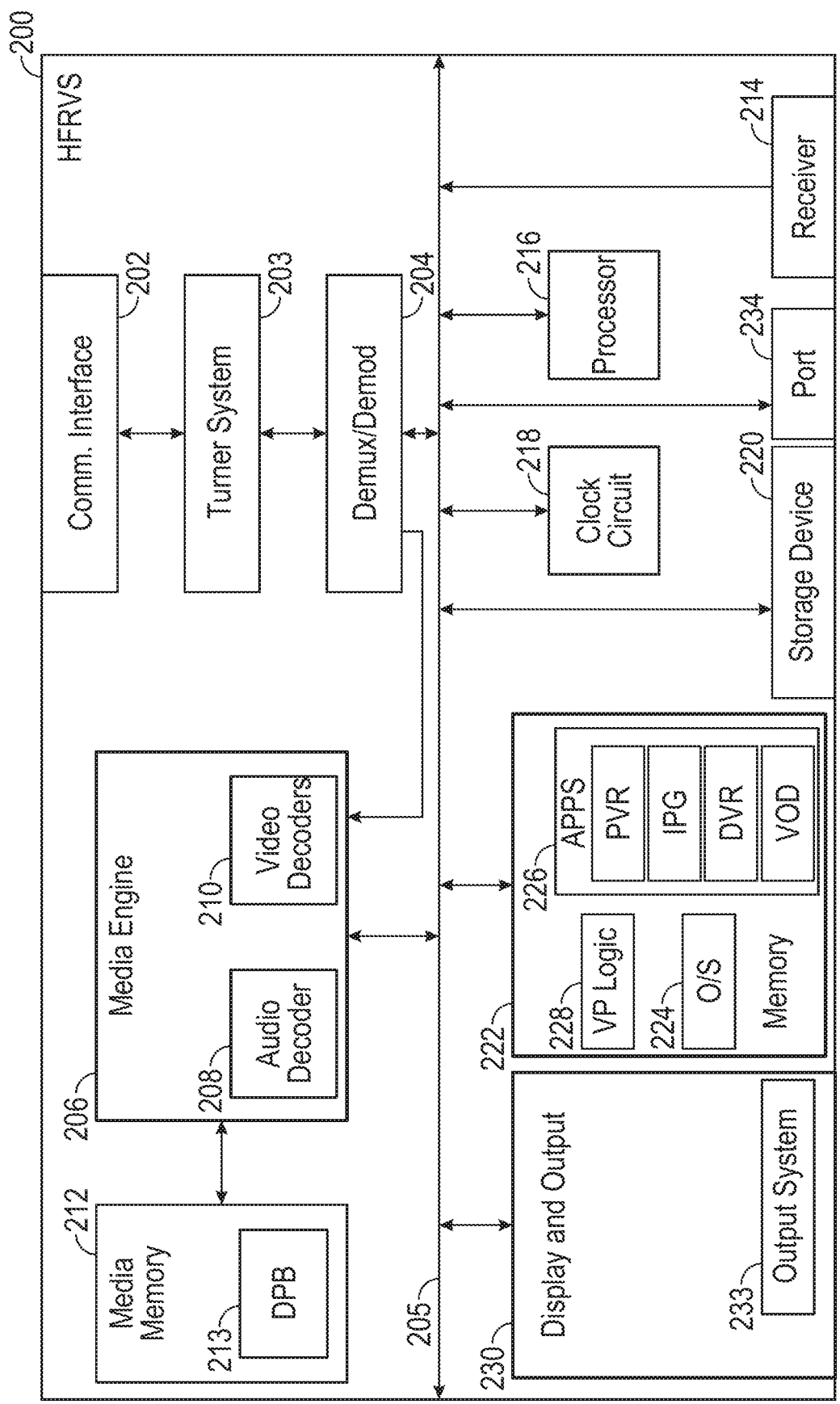
FIG. 2 is a block diagram of an example embodiment of a high frame rate video signal (HFRVS) device.

FIG. 2 is a block diagram of an example embodiment of a high frame rate video signal (HFRVS) device 200. The HFRVS 200 shown in FIG. 2 is merely illustrative, and should not be construed as implying any limitations upon the scope of the disclosure. In one embodiment, an HFRC system may include all components shown in, or described in association with, the HFRVS 200 of FIG. 2. In some embodiments, an HFRC system may include fewer components, such as those limited to facilitating and implementing providing, processing, or decoding of a coded video signal and/or output pictures corresponding to decoded versions of coded pictures in the coded video signal. In some embodiments, functionality of the HFRC system may be distributed among the HFRVS 200 and one or more additional devices as mentioned above.

The HFRVS 200 includes a communication interface 202 (e.g., depending on the implementation, suitable for coupling to the Internet, a coaxial cable network, an HFC network, satellite network, terrestrial network, cellular network, etc.) coupled in one embodiment to a front-end-processing component such as a tuner system 203. The tuner system 203 may include one or more tuners for receiving downloaded (or transmitted) media content. The tuner system 203 or front-end-processing component can be controlled to select from a plurality of transmission signals provided by the STS 100 (FIG. 1). The tuner system 203 or front-end-processing component enables the HFRVS 200 to receive downstream media and data transmissions, thereby allowing a user to receive digital media content via the STS 100. The tuner system 203 includes, in one implementation, an out-of-band tuner for bi-directional data communication and one or more tuners (in-band) for receiving television signals. In some embodiments (e.g., IPTV-configured VSRP devices), the tuner system may be omitted.

The tuner system 203 or front-end-processing component may be coupled to a demultiplexing/demodulation system 204 (herein, simply demux 204 for brevity). The demux 204 may include MPEG-2 Transport demultiplexing capabilities. When tuned to carrier frequencies carrying a digital transmission signal, the demux 204 enables the separation of packets of data, corresponding to the identifiable bitstreams of the selected or desired video service or video program, for further processing. Concurrently, a PID filtering component in the demux 204 precludes further processing of packets in the multiplexed transport bitstream that are irrelevant or not desired, such as packets of data corresponding to other video services or video programs. Parsing capabilities of the demux 204 allow for the ingesting by the HFRVS 200 of program associated information carried in the transport bitstream and/or coded video signal. The demux 204 is configured to identify and extract identified information in one or more bitstreams, such as assistance information, to facilitate the identification, extraction, and processing of the coded pictures. Such assistance information may correspond to a random access point ("RAP"), a tier value corresponding to each respective coded picture of a coded video signal, the start or initial transport packet of each respective picture in the bitstream corresponding to the base layer of the coded video signal, and the start or initial transport packet of each respective picture in the bitstream corresponding to the enhancement layer of the coded video signal. The last packet of a respective picture in a bitstream may be identified as the last packet prior to the initial packet corresponding to the next picture in that bitstream. Other such information includes Program Specific Information (PSI) (e.g., Program Map Table (PMT), Program Association Table (PAT), etc.) and parameters or syntactic elements (e.g., Program Clock Reference (PCR), time stamp information, payload_unit_start_indicator, etc.) of the transport bitstream (including packetized elementary bitstream (PES) packet information).

A demux 204 is coupled to a bus 205 and to a media engine 206. The media engine 206 includes, in one embodiment, decoding logic having one or more of a respective audio decoder 208 and video decoders 210. Video decoders 210 may be a single video decoder running multiple instances or multiple video decoders. Where a single video decoder is used in NHFRVS 201, the decoder may be timesliced. Timeslicing allows a single video decoder to operate virtually as two video decoders with respective memory portions without imposing an undue burden on the video decoding operation. A timesliced decoder may operate at a picture granularity to process two bitstreams that correspond to the same video programs; that is a first and second UHDTV video bitstream generates a single output video bitstream which is an HFR bitstream. In another embodiment, timeslicing may occur at the granularity of a slice.

Clearly other forms of timeslicing are possible. In an alternate embodiment, the timeslice is at a sub-GOP level. A sub-GOP is characterized by an anchor picture, either an intra coded picture or a forward predicted picture from the preceding (in decode order) anchor picture. A sub-GOP picture comprises an anchor picture and the set of pictures preceding the output of the anchor picture that use the forward predicted picture as a reference picture, such set of pictures being in decode order after the forward predicted picture. These set of pictures are referred to as "leading pictures" in the semantics of the High Efficiency Video Coding ("HEVC") specification. In yet another embodiment, the timeslice granularity employed for timeslicing a single video decoder as two video decoders at multiple sub-GOPs. In another embodiment, the timeslice interval is an Intra picture period.

The media engine 206 is further coupled to the bus 205 and to media memory 212, the latter which, in one embodiment, includes one or more respective buffers for temporarily storing compressed (compressed picture buffer or bit buffer, not shown) and/or reconstructed pictures (decoded picture buffer or DPB 213). In some embodiments, one or more of the buffers of the media memory 212 may reside in other memory (e.g., memory 222, explained below) or components.

The HFRVS 200 further includes additional components coupled to the bus 205 (though shown as a single bus, one or more buses are contemplated to be within the scope of the embodiments). For instance, the HFRVS 200 further includes a receiver 214 (e.g., infrared (IR), radio frequency (RF), etc.) to receive user input (e.g., via direct-physical or wireless connection via a keyboard, remote control, voice activation, etc.) to convey a user's request or command (e.g., for program selection, trick mode manipulation such as fast forward, rewind, pause, channel change, one or more processors (one shown) 216 for controlling operations of the HFRVS 200, and a clock circuit 218 comprising phase and/or frequency locked-loop circuitry to lock into a system time clock (STC) from a program clock reference, or PCR, received in the bitstream to facilitate decoding and output operations. Although described in the context of hardware circuitry, some embodiments of the clock circuit 218 may be configured as software (e.g., virtual clocks) or a combination of hardware and software. Further, in some embodiments, the clock circuit 218 is programmable.

The HFRVS 200 may further include a storage device 220 (and associated control logic as well as one or more drivers in memory 222) to temporarily store buffered media content and/or more permanently store recorded media content. The storage device 220 may be coupled to the bus 205 via an appropriate interface (not shown).

Memory 222 in the HFRVS 200 comprises volatile and/or non-volatile memory, and is configured to store executable instructions or code associated with an operating system (O/S) 224 and other applications, and one or more applications 226 (e.g., interactive programming guide (IPG), video-on-demand (VOD), personal video recording (PVR), WatchTV (associated with broadcast network TV), among other applications not shown such as pay-per-view, music, driver software, etc.).

Further included in one embodiment in memory 222 is video processing (VP) logic 228, which in one embodiment is configured in software. In some embodiments, VP logic 228 may be configured in hardware, or a combination of hardware and software. The VP logic 228, in cooperation with the processor 216, is responsible for interpreting assistance information and providing the appropriate settings for a display and output system 230 of the HFRVS 200. In some embodiments, functionality of the VP logic 228 may reside in another component within or external to memory 222 or be distributed among multiple components of the HFRVS 200 in some embodiments.

The HFRVS 200 is further configured with the display and output logic 230, as indicated above, which includes one or more output systems (e.g., configured as HDMI, DENC, or others) 233 to process the decoded pictures and provide for output or presentation (e.g., display) on display device 140. Though shown conceptually in FIG. 2 as an entity separate from the media engine 206, in some embodiments, one or more of the functionality of the display and output logic 230 may be incorporated in the media engine 206 (e.g., on a single chip) or elsewhere in some embodiments.

A communications port 234 (or ports) is (are) further included in the HFRVS 200 for receiving information from and transmitting information to other devices. For instance, the communication port 234 may feature USB (Universal Serial Bus), Ethernet, IEEE-1394, serial, and/or parallel ports, etc. The HFRVS 200 may also include one or more analog video input ports for receiving and/or transmitting analog video signals.

HFRVS 200 may include other components not shown, including decryptors, samplers, digitizers (e.g., analog-to-digital converters), multiplexers, conditional access processor and/or application software, driver software, Internet browser, among others. Further, though the VP logic 228 is illustrated as residing in memory 222, it should be understood that all or a portion of such logic 228 may be incorporated in, or distributed among, the media engine 206, the display and output system 230, or elsewhere. Similarly, in some embodiments, functionality for one or more of the components illustrated in, or described in association with, FIG. 2 may be combined with another component into a single integrated component or device.

The VP system (e.g., encoder 111, splicer 112, decoding logic (e.g., media engine 206), and/or display and output logic 230) may be implemented in hardware, software, firmware, or a combination thereof. To the extent certain embodiments of the VP system or a portion thereof are implemented in software or firmware (e.g., including the VP logic 228), executable instructions for performing one or more tasks of the VP system are stored in memory or any other suitable computer readable medium and executed by a suitable instruction execution system. In the context of this document, a computer readable medium is an electronic, magnetic, optical, or other physical device or means that can contain or store a computer program for use by or in connection with a computer related system or method.

To the extent certain embodiments of the VP system or portions thereof are implemented in hardware, the VP system may be implemented with any or a combination of the following technologies: a discreet logic circuit(s) having logic gates for implementing logic functions upon data signals, an application specific integrated circuit (ASIC) having appropriate combinational logic gates, programmable hardware such as a programmable gate array(s) (PGA), a field programmable gate array (FPGA), etc.

Having addressed certain embodiments of VP systems that decode the coded pictures of a bitstream, attention is directed to the use of the assistance information (or a separate and distinct piece of assistance information in some embodiments) to assist the affecting of trick mode functionality. An output clock (e.g., a clock residing in the clocking circuit 218 or elsewhere) residing in the HFRVS 200 drives the output of reconstructed pictures (e.g., with an output system 233 configured as HDMI or a DENC or other known output systems). The display and output logic 230 may operate in one of plural modes. In one mode, often referred to as passthrough mode, the HFRVS 200 behaves intelligently, providing an output picture format corresponding to the picture format determined upon the acquisition or start of a video service (such as upon a channel change) in union with the format capabilities of the display device 140 and user preferences. In a fixed mode (or also referred to herein as a non-passthrough mode), the output picture format is fixed by user input or automatically (e.g., without user input) based on what the display device 140 supports (e.g., based on interrogation by the set-top box of display device picture format capabilities).

In one embodiment, a system component such as the splicer 112 and/or encoder 111 deliver assistance information for reception and processing by the display and output logic 230, the assistance information conveying to the display and output logic 230 information to affect certain behavior to provide the requested trick mode. The assistance information may pertain to picture interdependencies related by successive tier numbers output of the decoded pictures. In some embodiments, a part of the assistance information may be provided according to a different mechanism or via a different channel or medium.

Figure 3:
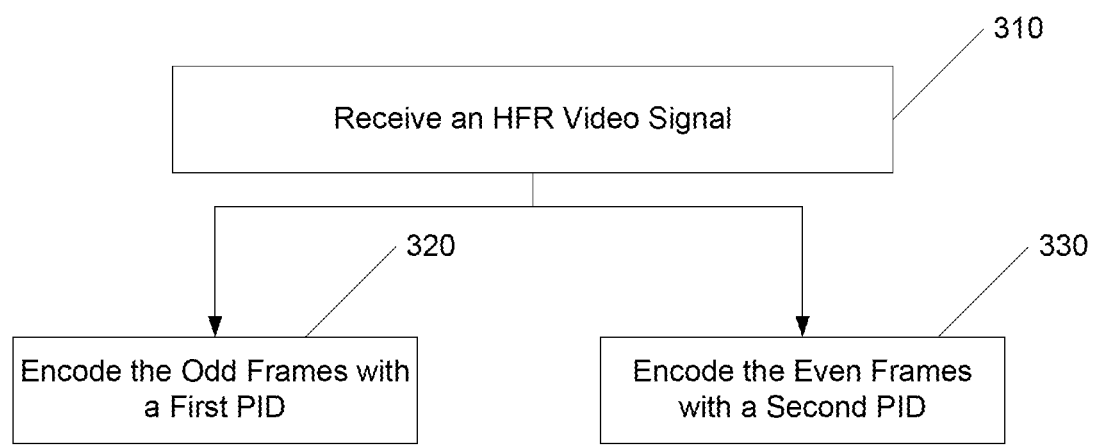
FIG. 3 is a flow diagram that illustrates one example method of encoding a high frame rate picture sequence.

FIG. 3 is a flow diagram that illustrates one example method of encoding a high frame rate picture sequence. An HFR video signal is received (stage 310). Odd frames are encoded to a first video bitstream at a fixed frame rate that is half the frame rate of the received HFR video signal (stage 320). The first video bitstream has a first PID. Even frames are encoded to a second video bitstream at a fixed frame rate that is half the frame rate of the received HFR video signal (stage 330). The second video bitstream has a second PID.

The frame rate of the first bitstream and the frame rate of the second bitstream will typically be the same. An alternative embodiment has the frame rate of the second bitstream at a multiple of the framerate of the first bitstream. Another alternative embodiment encodes more than two bitstreams to support a number of generations of receiver with ever increasing capabilities.

Figure 4:
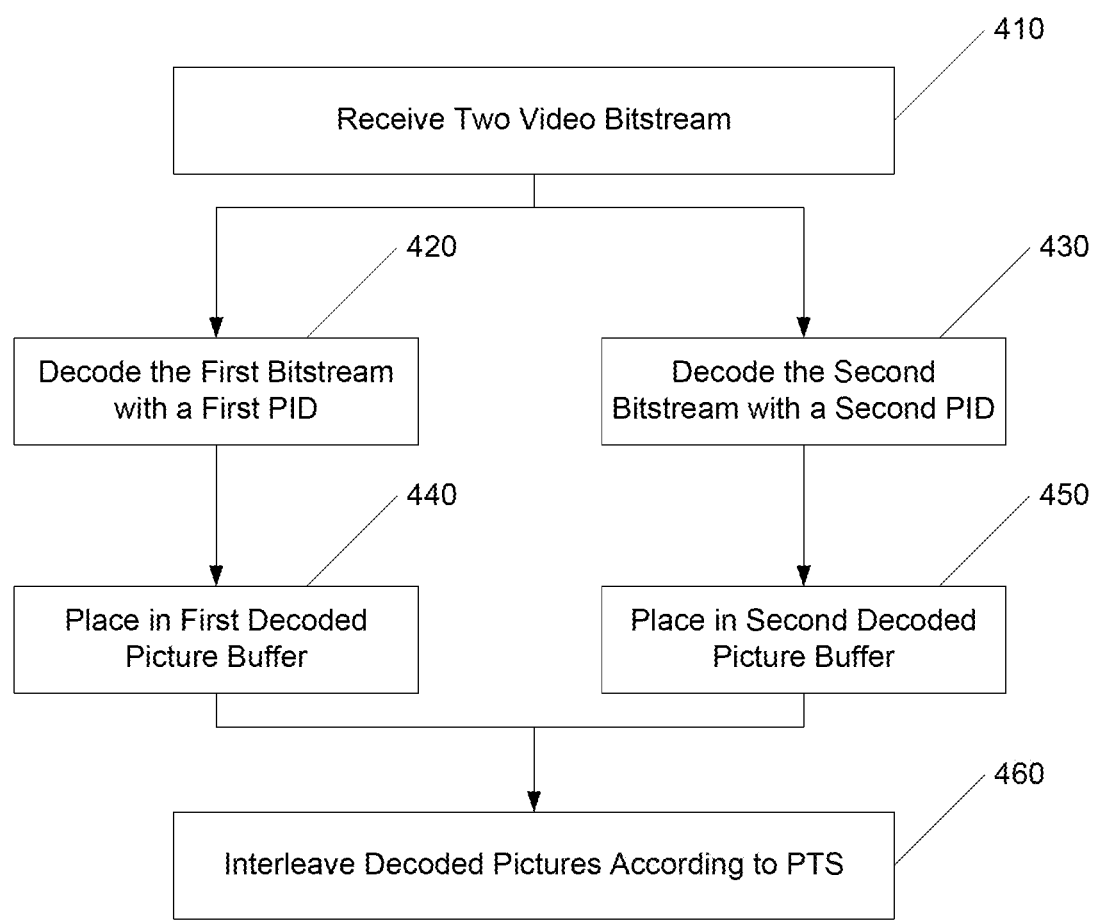
FIG. 4 is a flow diagram that illustrates one example method embodiment to decode a high frame rate video signal in a HFRVS-capable receiver.

FIG. 4 is a flow diagram that illustrates one example method to decode a high frame rate video signal in a HFRVS-capable receiver. Two video bitstreams are received, each having its own PID (stage 410). The first video bitstream having a first PID is decoded by a first decoder or decoder instance (stage 420). The second video bitstream having a second PID is decoded by a second decoder or decoder instance (stage 420). The output of the first decoder is placed in a first Decoded Picture Buffer ("DPB") (stage 440). The output of the second decoder is placed in a second DPB (stage 450). A display control logic section of a video display pipeline interleaves the pictures in the first and second DPB based on their presentation time stamp (stage 460).

A first generation receiver that is capable of standard UHDTV video would simply decode the first or the second video bitstream. It can achieve this through the use of PID filtering to block out the second UHDTV bitstream from penetrating the receiver's memory beyond the PID filtering stage.

Figure 5:
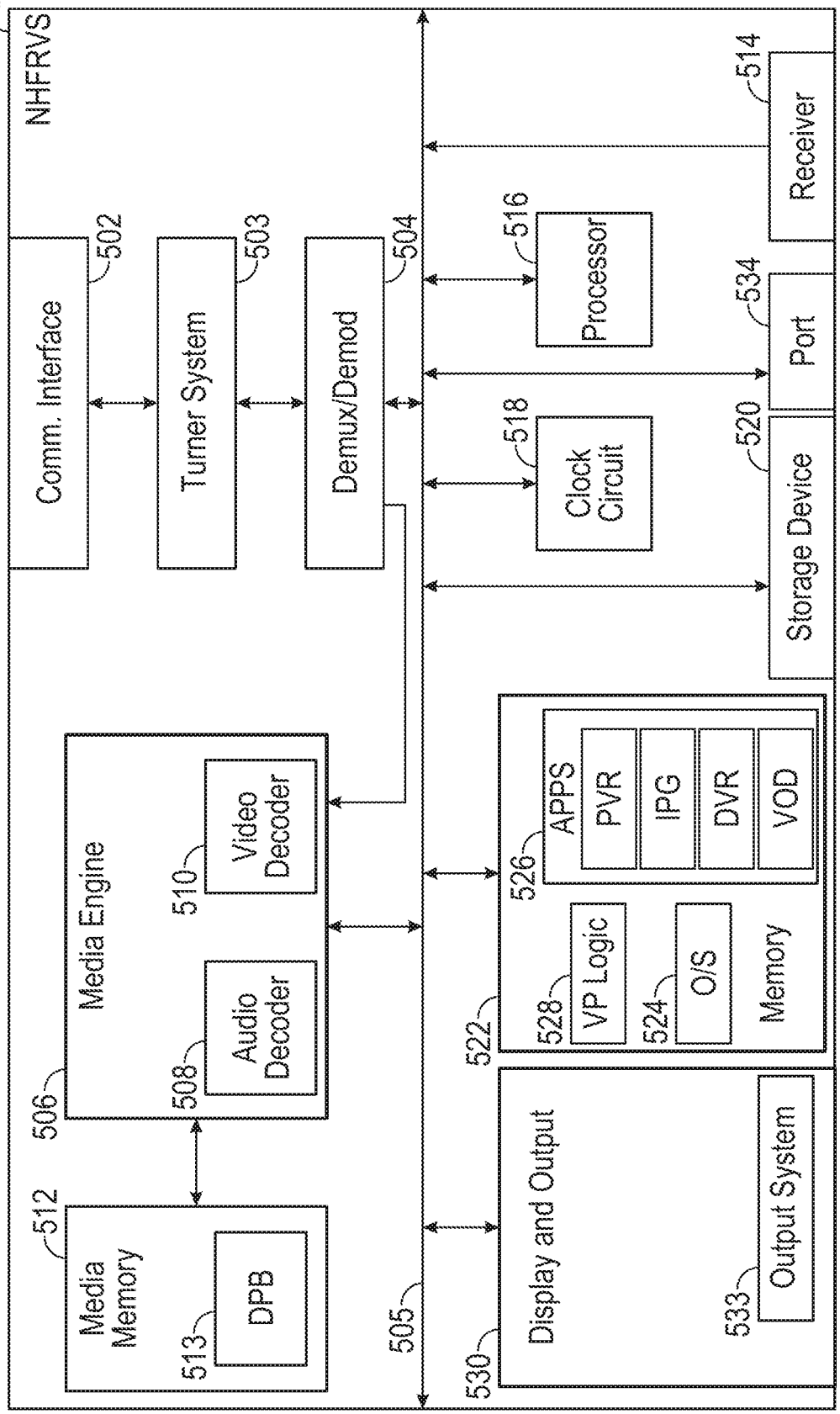
FIG. 5 is a block diagram of an example embodiment of a non-high frame rate video signal (NHFRVS) device.

FIG. 5 is a block diagram of an example embodiment of a non-high frame rate video signal (NHFRVS) device. The NHFRVS 201 shown in FIG. 5 is merely illustrative, and should not be construed as implying any limitations upon the scope of the disclosure. In one embodiment, an HFRC system may include all components shown in, or described in association with, the NHFRVS 201 of FIG. 5. In some embodiments, an HFRC system may include fewer components, such as those limited to facilitating and implementing providing, processing, or decoding of a coded video signal and/or output pictures corresponding to decoded versions of coded pictures in the coded video signal. In some embodiments, functionality of the HFRC system may be distributed among the NHFRVS 201 and one or more additional devices as mentioned above.

The NHFRVS 201 includes a communication interface 502 (e.g., depending on the implementation, suitable for coupling to the Internet, a coaxial cable network, an HFC network, satellite network, terrestrial network, cellular network, etc.) coupled in one embodiment to a front-end-processing component such as a tuner system 503. The tuner system 503 may include one or more tuners for receiving downloaded (or transmitted) media content. The tuner system 503 or front-end-processing component can be controlled to select from a plurality of transmission signals provided by the STS 100 (FIG. 1). The tuner system 503 or front-end-processing component enables the NHFRVS 201 to receive downstream media and data transmissions, thereby allowing a user to receive digital media content via the STS 100. The tuner system 503 includes, in one implementation, an out-of-band tuner for bi-directional data communication and one or more tuners (in-band) for receiving television signals. In some embodiments (e.g., IPTV-configured VSRP devices), the tuner system may be omitted.

The tuner system 503 or front-end-processing component may be coupled to a demultiplexing/demodulation system 504 (herein, simply demux 204 for brevity). The demux 504 may include MPEG-2 Transport demultiplexing capabilities. When tuned to carrier frequencies carrying a digital transmission signal, the demux 504 enables the separation of packets of data, corresponding to the identifiable bitstreams of the selected or desired video service or video program, for further processing. Concurrently, a PID filtering component in the demux 504 precludes further processing of packets in the multiplexed transport bitstream that are irrelevant or not desired, such as packets of data corresponding to other video services or video programs. Parsing capabilities of the demux 504 allow for the ingesting by the NHFRVS 201 of program associated information carried in the transport bitstream and/or coded video signal. The demux 504 is configured to identify and extract identified information in one or more bitstreams, such as assistance information, to facilitate the identification, extraction, and processing of the coded pictures. Such assistance information may correspond to a RAP, the tier value corresponding to each respective coded picture of a coded video signal, the start or initial transport packet of each respective picture in the bitstream corresponding to the base layer of the coded video signal, and the start or initial transport packet of each respective picture in the bitstream corresponding to the enhancement layer of the coded video signal. The last packet of a respective picture in a bitstream may be identified as the last packet prior to the initial packet corresponding to the next picture in that bitstream. Other such information includes Program Specific Information (PSI) (e.g., Program Map Table (PMT), Program Association Table (PAT), etc.) and parameters or syntactic elements (e.g., Program Clock Reference (PCR), time stamp information, payload_unit_start_indicator, etc.) of the transport bitstream (including packetized elementary bitstream (PES) packet information).

A demux 504 is coupled to a bus 505 and to a media engine 506. The media engine 506 includes, in one embodiment, decoding logic having one or more of a respective audio decoder 508 and video decoder 510. Video decoders 510 may be a single video decoder.

The media engine 506 is further coupled to the bus 505 and to media memory 512, the latter which, in one embodiment, includes one or more respective buffers for temporarily storing compressed (compressed picture buffer or bit buffer, not shown) and/or reconstructed pictures (decoded picture buffer or DPB 513). In some embodiments, one or more of the buffers of the media memory 512 may reside in other memory (e.g., memory 522, explained below) or components.

The NHFRVS 200 further includes additional components coupled to the bus 505 (though shown as a single bus, one or more buses are contemplated to be within the scope of the embodiments). For instance, the NHFRVS 201 further includes a receiver 514 (e.g., infrared (IR), radio frequency (RF), etc.) to receive user input (e.g., via direct-physical or wireless connection via a keyboard, remote control, voice activation, etc.) to convey a user's request or command (e.g., for program selection, trick mode manipulation such as fast forward, rewind, pause, channel change, one or more processors (one shown) 516 for controlling operations of the NHFRVS 201, and a clock circuit 518 comprising phase and/or frequency locked-loop circuitry to lock into a system time clock (STC) from a program clock reference, or PCR, received in the bitstream to facilitate decoding and output operations. Although described in the context of hardware circuitry, some embodiments of the clock circuit 518 may be configured as software (e.g., virtual clocks) or a combination of hardware and software. Further, in some embodiments, the clock circuit 518 is programmable.

The NHFRVS 201 may further include a storage device 520 (and associated control logic as well as one or more drivers in memory 522) to temporarily store buffered media content and/or more permanently store recorded media content. The storage device 520 may be coupled to the bus 505 via an appropriate interface (not shown).

Memory 522 in the NHFRVS 201 comprises volatile and/or non-volatile memory, and is configured to store executable instructions or code associated with an operating system (O/S) 524 and other applications, and one or more applications 526 (e.g., interactive programming guide (IPG), video-on-demand (VOD), personal video recording (PVR), WatchTV (associated with broadcast network TV), among other applications not shown such as pay-per-view, music, driver software, etc.).

Further included in one embodiment in memory 522 is video processing (VP) logic 528, which in one embodiment is configured in software. In some embodiments, VP logic 528 may be configured in hardware, or a combination of hardware and software. The VP logic 528, in cooperation with the processor 516, is responsible for interpreting assistance information and providing the appropriate settings for a display and output system 530 of the NHFRVS 201. In some embodiments, functionality of the VP logic 528 may reside in another component within or external to memory 522 or be distributed among multiple components of the NHFRVS 201 in some embodiments.

The NHFRVS 201 is further configured with the display and output logic 530, as indicated above, which includes one or more output systems (e.g., configured as HDMI, DENC, or others) 533 to process the decoded pictures and provide for output or presentation (e.g., display) on display device 140. Though shown conceptually in FIG. 5 as an entity separate from the media engine 506, in some embodiments, one or more of the functionality of the display and output logic 530 may be incorporated in the media engine 506 (e.g., on a single chip) or elsewhere in some embodiments.

A communications port 534 (or ports) is (are) further included in the NHFRVS device 201 for receiving information from and transmitting information to other devices. For instance, the communication port 534 may feature USB (Universal Serial Bus), Ethernet, IEEE-1394, serial, and/or parallel ports, etc. The NHFRVS 201 may also include one or more analog video input ports for receiving and/or transmitting analog video signals.

NHFRVS 201 may include other components not shown, including decryptors, samplers, digitizers (e.g., analog-to-digital converters), multiplexers, conditional access processor and/or application software, driver software, Internet browser, among others. Further, though the VP logic 528 is illustrated as residing in memory 522, it should be understood that all or a portion of such logic 528 may be incorporated in, or distributed among, the media engine 506, the display and output system 530, or elsewhere. Similarly, in some embodiments, functionality for one or more of the components illustrated in, or described in association with, FIG. 5 may be combined with another component into a single integrated component or device.

The VP system (e.g., encoder 111, splicer 112, decoding logic (e.g., media engine 506), and/or display and output logic 530) may be implemented in hardware, software, firmware, or a combination thereof. To the extent certain embodiments of the VP system or a portion thereof are implemented in software or firmware (e.g., including the VP logic 528), executable instructions for performing one or more tasks of the VP system are stored in memory or any other suitable computer readable medium and executed by a suitable instruction execution system. In the context of this document, a computer readable medium is an electronic, magnetic, optical, or other physical device or means that can contain or store a computer program for use by or in connection with a computer related system or method.

To the extent certain embodiments of the VP system or portions thereof are implemented in hardware, the VP system may be implemented with any or a combination of the following technologies: a discreet logic circuit(s) having logic gates for implementing logic functions upon data signals, an application specific integrated circuit (ASIC) having appropriate combinational logic gates, programmable hardware such as a programmable gate array(s) (PGA), a field programmable gate array (FPGA), etc.

Having addressed certain embodiments of VP systems that decode the coded pictures of a bitstream, attention is directed to the use of the assistance information (or a separate and distinct piece of assistance information in some embodiments) to assist the affecting of trick mode functionality. An output clock (e.g., a clock residing in the clocking circuit 518 or elsewhere) residing in the NHFRVS device 201 drives the output of reconstructed pictures (e.g., with an output system 533 configured as HDMI or a DENC or other known output systems). The display and output logic 530 may operate in one of plural modes. In one mode, often referred to as passthrough mode, the NHFRVS 201 behaves intelligently, providing an output picture format corresponding to the picture format determined upon the acquisition or start of a video service (such as upon a channel change) in union with the format capabilities of the display device 140 and user preferences. In a fixed mode (or also referred to herein as a non-passthrough mode), the output picture format is fixed by user input or automatically (e.g., without user input) based on what the display device 140 supports (e.g., based on interrogation by the set-top box of display device picture format capabilities).

In one embodiment, a system component such as the splicer 112 and/or encoder 111 deliver assistance information for reception and processing by the display and output logic 530, the assistance information conveying to the display and output logic 530 information to affect certain behavior to provide the requested trick mode. The assistance information may pertain to picture interdependencies related by successive tier numbers output of the decoded pictures. In some embodiments, a part of the assistance information may be provided according to a different mechanism or via a different channel or medium.

Any process descriptions or blocks in flow charts or flow diagrams should be understood as representing modules, segments, or portions of code which include one or more executable instructions for implementing specific logical functions or steps in the process, and alternate implementations are included within the scope of the present disclosure in which functions may be executed out of order from that shown or discussed, including substantially concurrently or in reverse order, depending on the functionality involved. In some embodiments, steps of processes identified in FIGS. 3 and 4 using separate boxes can be combined. Further, the various steps in the flow diagrams illustrated in conjunction with the present disclosure are not limited to the architectures described above in association with the description for the flow diagram (as implemented in or by a particular module or logic) nor are the steps limited to the example embodiments described in the specification and associated with the figures of the present disclosure. In some embodiments, one or more steps may be added to the methods described in FIGS. 3 and 4 either in the beginning, end, and/or as intervening steps, and that in some embodiments, fewer steps may be implemented.

It should be emphasized that the above-described embodiments of the present disclosure are merely possible examples of implementations, merely set forth for a clear understanding of the principles of the HFRC systems and methods. Many variations and modifications may be made to the above-described embodiment(s) without departing substantially from the spirit and principles of the disclosure. Although all such modifications and variations are intended to be included herein within the scope of this disclosure and protected by the following claims, the following claims are not necessarily limited to the particular embodiments set out in the description.

We claim:

1. An apparatus comprising:
   a memory; and
   one or more processors configured to execute instructions stored in the memory, the instructions comprising:
   receiving a first bitstream having a first packet identifier ("PID") and a second bitstream having a second PID;
   decoding the first bitstream using a first decoder;
   decoding the second bitstream using a second decoder, the second decoder being different from the first decoder;
   interleaving the decoded first bitstream and the decoded second bitstream to form a high frame rate video signal, wherein interleaving the decoded first bitstream and the decoded second bitstream comprises combining the decoded first bitstream and the decoded second bitstream in a common output pipeline, and wherein the high frame rate video signal has a frame rate equal to the sum of the frame rate of the decoded first bitstream and the decoded second bitstream; and
   repeating each frame of the first bitstream to form the high frame rate video signal when the second decoded bitstream is not present.

2. The apparatus of claim 1, wherein the instructions further comprise:
   placing the decoded first bitstream into a first decoded picture buffer and placing the decoded second bitstream into a second decoded picture buffer.

3. The apparatus of claim 1, wherein the decoded first bitstream has a first plurality of frames each having a presentation time stamp and the decoded second bitstream has a second plurality of frames each having another presentation time stamp.

4. The apparatus of claim 3, wherein the instructions further comprise interleaving the decoded first bitstream and the decoded second bitstream based on presentation time stamps of the first plurality of frames and the second plurality of frames.

5. The apparatus of claim 1, wherein the first decoder and the second decoder are a first instance and a second instance of a single decoder.

6. The apparatus of claim 5, further comprising instructions for timeslicing the single decoder.

7. The apparatus of claim 5, further comprising instructions for timeslicing the single decoder at a picture granularity.

8. The apparatus of claim 5, further comprising instructions for timeslicing the single decoder at the granularity of a slice.

9. The apparatus of claim 5, further comprising instructions for timeslicing the single decoder at a sub-GOP level.

10. The apparatus of claim 5, further comprising instructions for timeslicing the single decoder at an interval of an Intra picture period.

11. The apparatus of claim 5, further comprising instructions for using the decoded first bitstream for trick mode operations.

12. A method, comprising:
receiving a first bitstream having a first packet identifier ("PID") and a second bitstream having a second PID;
decoding the first bitstream using a first decoder;
decoding the second bitstream using a second decoder, the second decoder being different from the first decoder;
interleaving the decoded first bitstream and the decoded second bitstream to form a high frame rate video signal, wherein interleaving the decoded first bitstream and the decoded second bitstream comprises combining the decoded first bitstream and the decoded second bitstream in a common output pipeline, and wherein the high frame rate video signal has a frame rate equal to the sum of the frame rate of the decoded first bitstream and the decoded second bitstream; and
repeating each frame of the first bitstream to form the high frame rate video signal when the second decoded bitstream is not present.

13. The method of claim 12, further comprising:
placing the decoded first bitstream into a first decoded picture buffer and placing the decoded second bitstream into a second decoded picture buffer.

14. The method of claim 12, wherein the decoded first bitstream has a first plurality of frames each having a presentation time stamp and the decoded second bitstream has a second plurality of frames each having another presentation time stamp.

15. The method of claim 14, wherein interleaving further comprises interleaving the decoded first bitstream and the decoded second bitstream based on presentation time stamps of the first plurality of frames and the second plurality of frames.

16. The method of claim 12, wherein the first decoder and the second decoder are a first instance and a second instance of a single decoder.

17. The method of claim 12, further comprising instructions for using the decoded first bitstream for trick mode operations.

18. The method of claim 12, wherein the first decoder and the second decoder operate on a same derived system clock derived from the high frame rate video signal.

19. The apparatus of claim 1, wherein the first decoder and the second decoder operate on a same derived system clock derived from the high frame rate video signal.

* * * * *